C. H. BUCK.
TROLLEY HEAD.
APPLICATION FILED JAN. 13, 1912.
1,053,006.
Patented Feb. 11, 1913.
2 SHEETS—SHEET 1.
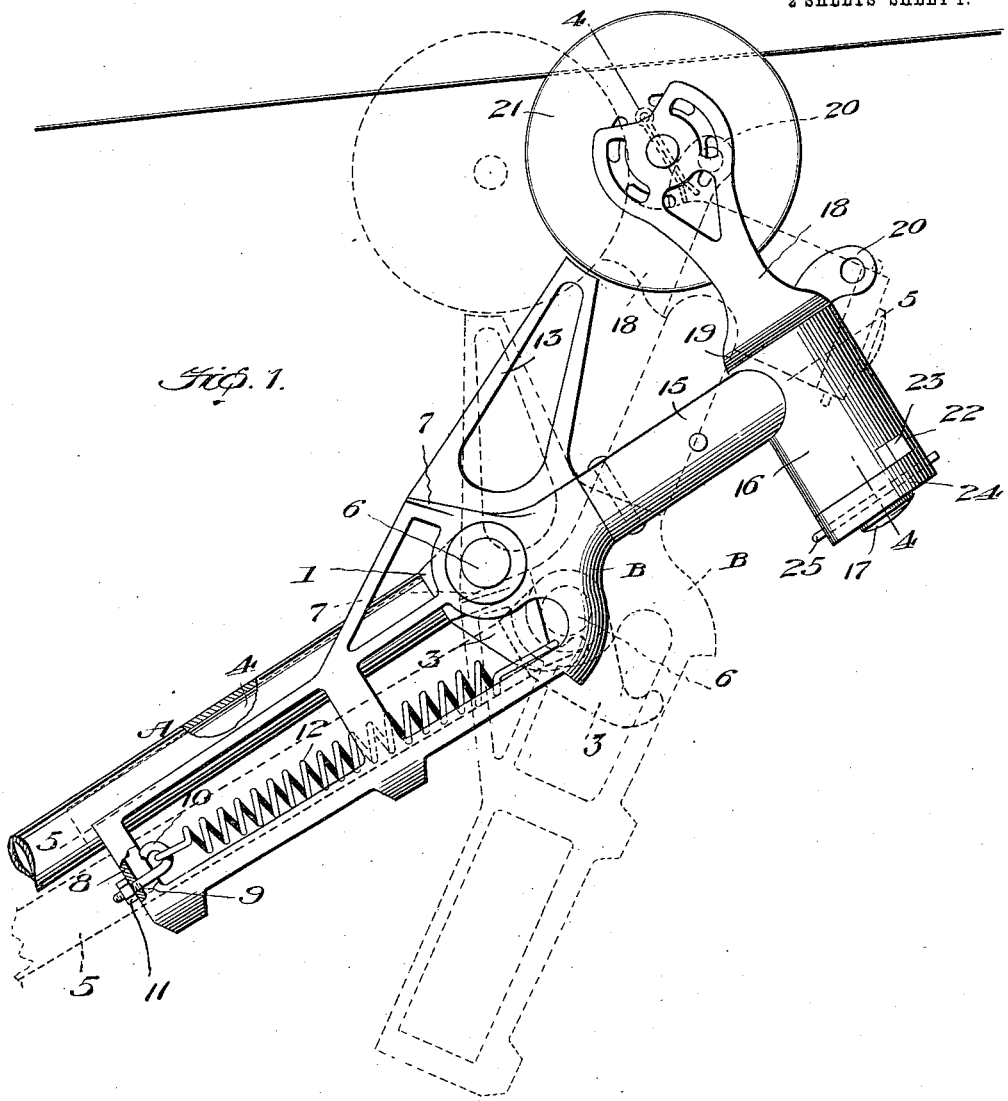
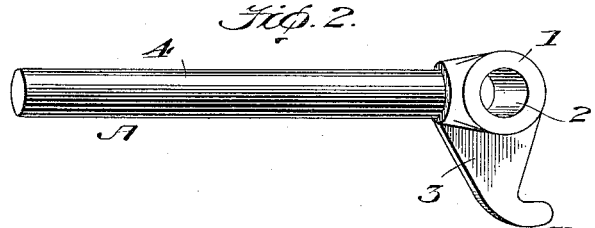
Witnesses
Inventor
Chester H. Buck
By Victor J. Evans
Attorney

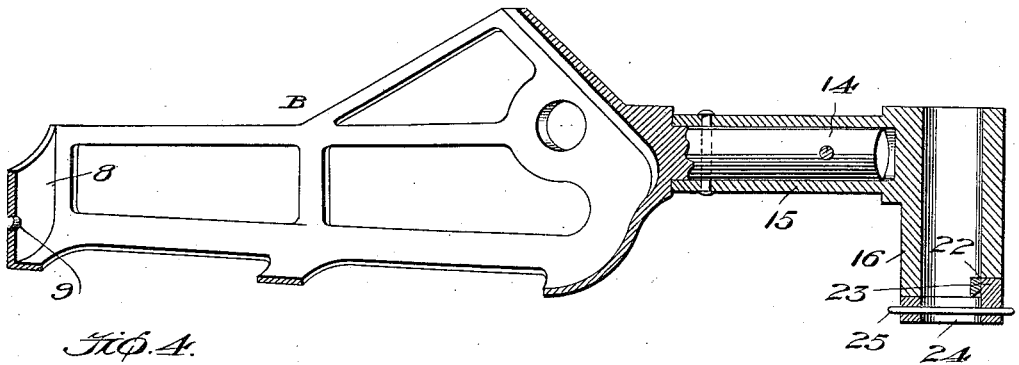
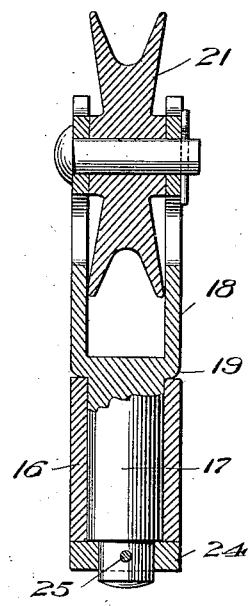
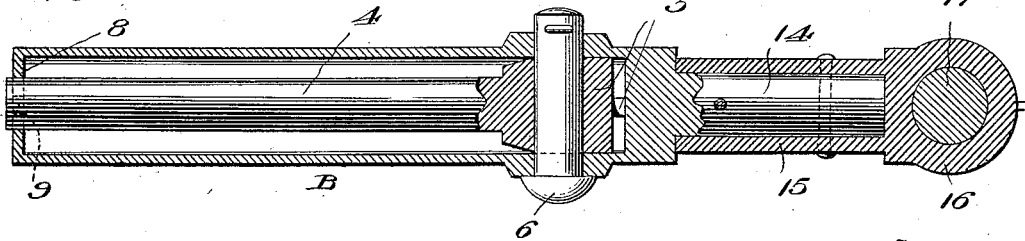

UNITED STATES PATENT OFFICE.

CHESTER H. BUCK, OF CLEVELAND, TENNESSEE.

TROLLEY-HEAD.

1,053,006.　　　　　Specification of Letters Patent.　　Patented Feb. 11, 1913.

Application filed January 13, 1912.　Serial No. 670,970.

*To all whom it may concern:*

Be it known that I, CHESTER H. BUCK, a citizen of the United States, residing at Cleveland, in the county of Bradley and State of Tennessee, have invented new and useful Improvements in Trolley-Heads, of which the following is a specification.

This invention relates to trolley heads, and it has for its object to produce a device of this class of simple and efficient construction whereby the trolley wheel will be held in contact with the feed wire under the various conditions that may arise in operation, due to the oscillation of the trolley rod or other causes.

A further object of the invention is to provide a simple and improved construction whereby the trolley wheel shall be guided squarely upon the wire without danger of crossing the wire as is now frequently the case in turning corners and the like, thereby causing undue wear upon the flanges of the wheel and also causing danger of the wire climbing the flanges and causing the wheel to become disengaged therefrom.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a sectional side elevation of a trolley head constructed in accordance with the invention, dotted lines being employed to indicate a position which may be assumed when the device is in operation. Fig. 2 is a perspective detail view of the supporting member, detached. Fig. 3 is a perspective detail view of the casing coöperating with the supporting member, detached. Fig. 4 is a sectional detail view taken on the line 4—4 in Fig. 1. Fig. 5 is a sectional detail view taken on the line 5—5 in Fig. 1. Fig. 6 is a detail plan view of the lower end of the bearing sleeve. Fig. 7 is a detail plan view of the washer member coöperating therewith.

Corresponding parts in the several figures are denoted by like characters of reference.

A supporting member A is provided comprising a head 1 having a transverse aperture 2, a downwardly extending hook member 3 and an arm 4, the latter being adapted to be inserted into and suitably connected with a tubular trolley rod of ordinary construction, and a portion of which is indicated at 5.

B is a casing which is pivotally connected with the head 1 of the supporting member by means of a pin or bolt 6 passing transversely therethrough, said casing being normally positioned adjacent to the underside of the upper portion of the trolley rod. The upper side of the casing is open to enable said casing to swing or rock upon the pivot 6, the movement in one direction being limited by the end wall 8 whereby the trolley wheel, which is mounted as will be hereinafter described, is maintained in engaging position with respect to the feed wire. Said end wall is apertured, as shown at 9, for the passage of the shank of a hook bolt 10 which is adjustably secured by means of a nut 11 and which is connected by a helical spring 12 with the hook member 3 of the head 1. The oblique wall portion 7 has an upwardly and rearwardly extending flange 13, the use of which will hereinafter be made apparent.

The casing member B has a rearwardly extending cylindrical arm 14 adapted for engagement with a sleeve 15 that extends laterally from the cylindrical tubular head member 16 which latter constitutes a boxing or bearing wherein the spindle 17 of the trolley harp 18 is journaled, said harp being provided with a shoulder or offset 19 engaging the upper extremity of the tubular bearing 16, said shoulder or offset being also provided with an apertured lug 20 for the attachment of the trolley cord. The trolley wheel 21 is journaled in the harp in the customary or in any suitable, well known and convenient manner. It is obvious that the spindle 17 will have a swiveling movement in the bearing 16, and in order to properly limit such movement, the lower extremity of the tubular bearing member 16 is provided with a recess 22 for the reception of a radial lug 23 formed upon a collar or washer 24, which latter is secured upon the lower extremity of the spindle 17 by means of a pin or key 25 extending transversely therethrough and serving to assemble the parts. It is obvious that by varying the relative dimensions of the recess 22 and the lug 23, the swiveling movement of the spindle 17 may be regulated and limited to any desired extent.

Under the construction as herein described, it will be seen that when, owing to vibration or oscillation of the trolley rod, the wheel is moved downward away from the trolley wire, the tension of the spring 12 will be exerted to tilt the casing B, as indicated in dotted lines in Fig. 1 of the drawings, thereby retaining the trolley wheel in contact with the wire, said spring being sensitive and quick to respond so that there will be little or no danger of the possibility of the wheel becoming disengaged from the trolley wire. In other words, whenever the oscillation of the trolley pole tends to release the pressure of the wheel of the trolley wire, the action of the spring 12 upon the pivoted casing member will cause the wheel to be thrust a sufficient distance in the opposite direction to maintain its contact consistently with the trolley wire which it would not do if rigidly attached to the trolley pole, as has heretofore been customary. It will, furthermore, be seen that in the passing of the car around a curve the trolley harp will turn in its bearing to adjust itself with reference to the plane of the trolley wire and by reason of such action will prevent the friction that is usually caused between the wheel and the wire caused by the wire crossing the groove of the wheel and rubbing the opposite flanges of the wheel at the front and rear. The wire will also thereby be prevented from climbing the flange of the wheel and so leaving the wire altogether. The flange member 13 associated with the pivoted casing B will serve to guide the trolley wheel beneath spanning wires and other such means as may be used to support the trolley wire overhead in case the said wheel by any mischance should fail to maintain its position on the trolley wire, said flange constituting a guard whereby the wheel and its supporting means will be deflected downwardly by engagement with the transverse supporting or spanning wires.

It will be noted that by reason of the improved construction of the device as herein described, the several parts or members are distinct, separable and interchangeable so that damage done to any one of the members will not involve the loss of the entire device, but the damaged part may be easily and quickly replaced, avoiding also long delays for repairs and replacements of parts.

Having thus described the invention, what is claimed as new, is:—

1. In a device of the class described, a supporting member comprising a transversely apertured head having a downwardly extending hook and a trolley pole engaging arm, a casing pivotally connected with the apertured head and having an end wall to limit the movement of said casing member in one direction, a hook member attached to the end wall of the casing, and a helical spring within the casing and connecting the hook member attached to the end wall with the hook member of the transversely apertured head.

2. In a device of the character described, a supporting member including a transversely apertured head and a downwardly extending hook, a casing member pivotally connected with the head, said casing member having a wall portion to limit the swinging movement of the casing member in one direction, a tension spring connecting the hook of the supporting member with the end of the pivoted casing member distant therefrom, a bearing sleeve formed on the pivoted casing, and a spindle supported in the bearing sleeve, said spindle being equipped with a wheel carrying harp.

In testimony whereof I affix my signature in presence of two witnesses.

CHESTER H. BUCK.

Witnesses:
 FRANK J. HARLE,
 C. L. WILSON.

Copies of this patent may be obtained for five cents each, by addressing the "Commissioner of Patents, Washington, D. C."